June 1, 1954  C. H. FAY  2,679,757
APPARATUS FOR RECORDING SUBSURFACE MEASUREMENTS
Filed April 9, 1948  3 Sheets-Sheet 1

Inventor: Charles H. Fay
By [signature]
His Attorney

Inventor: Charles H. Fay
By _____
His Attorney

Patented June 1, 1954

2,679,757

UNITED STATES PATENT OFFICE 2,679,757

APPARATUS FOR RECORDING SUBSURFACE MEASUREMENTS

Charles H. Fay, Houston, Tex., assignor to Shell Development Company, San Francisco, Calif., a corporation of Delaware Application April 9, 1948, Serial No. 20,007

5 Claims. (Cl. 73—345)

This invention pertains to the measurement and recording of variable physical conditions or quantities in difficultly accessible places, and relates particularly to apparatus whereby said conditions may be measured below the surface of the ground or of a body of water and simultaneously recorded at the surface.

In drilling, controlling and operating boreholes, especially such as deep oil or gas wells, as well as in other operations, such for example as in exploring for mineral or petroleum deposits below the surface of the ground or of a body of water, an accurate knowledge of subsurface conditions is often of essential importance to the operator. As examples of such conditions or quantities, the following may be listed: the temperature and pressure in a borehole; the nature, composition, viscosity or salinity of the fluid therein; the rate of flow of said fluid; the points of entry of a contaminating fluid; the spontaneous potentials appearing at the junction of different fluid phases; the variations in the value of the force of gravity occurring with changes of depth, etc.

In many cases it is likewise important to measure conditions or factors which may affect the drilling or the placement of well equipment in the borehole, such as the deviation of a borehole from the vertical, its orientation, etc.

Although only some of the subsurface conditions listed above are of strictly physical nature, such for example, as temperature, pressure or gravity, while others are more of a chemical nature, such for example as the composition or salinity of a well fluid, the term "physical condition" will be broadly applied hereinbelow to cover any type of subsurface conditions to be measured. Likewise, the term "subsurface" is understood to apply to measurements effected both under the surface of the ground or of a body of water such as the sea.

While many devices, such as pressure and temperature bombs, water witches, flow meters, logging devices, inclinometers, etc. have been developed to measure these conditions, quantities or factors, the records obtained by means of these devices have often been unsatisfactory either because of a lack of the required accuracy or reliability, or because of a delay intervening between the time of the actual measurements and the time at which the record of said measurements is made available to the operator.

It is therefore an object of this invention to provide a system whereby substantially any subsurface measurements can be instantaneously recorded at the surface by recording means electrically synchronized with the measuring means.

Briefly, the operation of the present system may be outlined as follows. A detector or subsurface portion of the system comprising one or more measuring elements responsive to one or more physical conditions such as pressure, temperature, flow rate, well inclination, etc. is positioned underground or underwater. A change in any of these conditions causes the measuring element responsive thereto to effect a proportional rotational or angular displacement between a movable condition-responsive or indicating element or contact and a fixed reference element or contact. The angular displacement between the indicating and the reference elements is cyclically translated into time intervals by means of an electrical sweep arm element continuously rotated at a constant speed, said sweep arm cyclically and successively contacting the reference element and the condition-responsive element to produce pulses or signals which are sent to the recording portion of the system at the surface through a conductor cable.

The recording system preferably comprises a drum which is rotated in synchronism with the sweep arm element of the measuring system, and a marking element which is moved parallel to the axis of the drum at a rate fixed by the desired time scale. The terms: "in synchronism" or "synchronized" are used herein to denote a condition wherein the drum element of the recording system rotates at a speed which is equal to that of the sweep arm element of the measuring system, or which stands in an integral ratio thereto, whereby the same events stand always in the same phase angle relationship in the measuring and the recording systems. The drum and the marking elements form the terminals or contacts of an electrical circuit, and a current or spark is caused to pass therebetween every time that a pulse or signal is received through the conductor cable from the measuring subsurface system. The drum carries on its outer surface a chart made of a chemically treated paper (such for example, as the electrolytic recorder papers described in "Industrial and Engineering Chemistry" for October 1947, page 1286), so that a current or spark passing through said paper between the drum and the marker produces a discoloration in the form of a dot. A series of such closely spaced dots forms a record line on the chart.

Since it is in general expedient to measure and to record at once a plurality of subsurface conditions, and since in many cases such multiple recording is essential for the purpose of interpretation of the interrelated data (as in the case of temperature and pressure measurements, resitivity and spontaneous potential measurements, etc.), an especially advantageous feature of the present invention lies in its adaptability to multiple recording of a plurality of subsurface conditions. It will therefore be described with regard to an embodiment whereby changes in two subsurface conditions or quantities, such as pressure and temperature, can be simultaneously recorded. The invention however, is in no way limited to the measurement and recording of these two particular conditions or of any two conditions, but is applicable for the measurement and simultaneous recording of any reasonable number of any of subsurface conditions referred to hereinabove, in a manner which will be clearly understood from the following description, taken with reference to the attached drawings, wherein:

Figure 1:
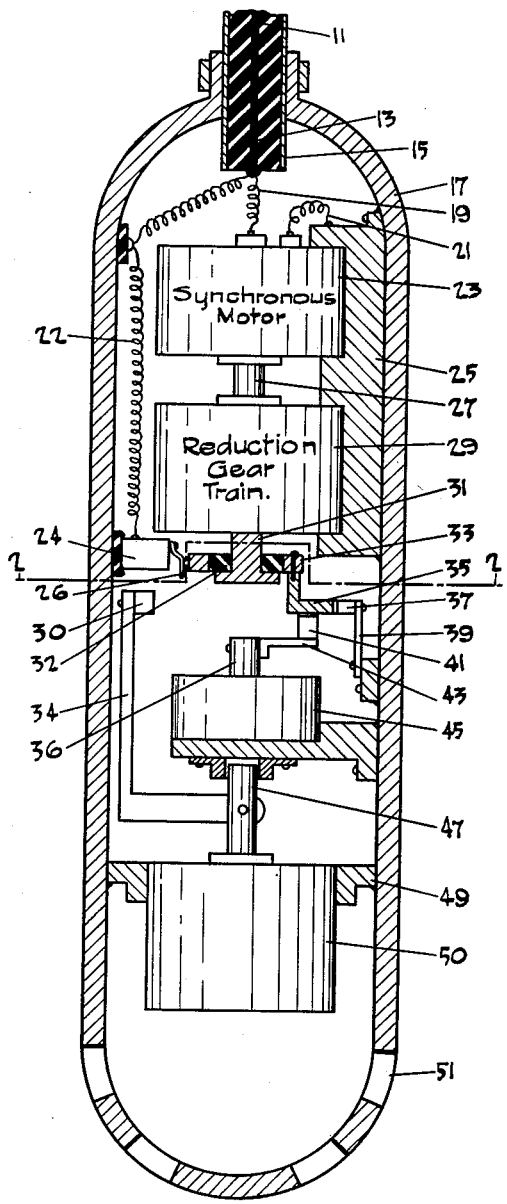
Fig. 1 is a diagrammatic view in cross-section of a housing containing the subsurface portion of the present system.

Referring to Fig. 1, a housing 17, comprising the subsurface or measuring portion of the present system, is shown attached in fluid-tight manner to a supporting cable 11. Although an insulating cable comprising a plurality of conductors embedded therein may be used, it is preferred to use an insulating cable having a single electrical conductor 13 embedded therein. The cable 11 is provided with a metallic sheath 15, in contact with the housing and with the fluid of the well, said sheath 15 forming the return lead of the circuit by means of which operating electric energy is supplied to the measuring housing and signals are relayed from the housing to the surface, as will be shown hereinbelow.

The housing is preferably made of a plurality of cylindrical or streamlined metallic sections connected with each other by suitable screw-threads or other means to permit easy access to the inside thereof; for simplicity, however, the housing is diagrammatically shown in the drawing as a single shell. The size of the housing 17 may be varied in accordance with the purposes for which it is intended. For uses in relatively restricted places, such as well tubing or pipe, it is possible to construct the housing 17 with a very small outside diameter, such as 1¼ inches.

Held within the housing by any desired means, for example, by being screw-threaded within the housing or attached thereto by means such as diagrammatically represented by a bracket 25, is an alternating current motor 23 of the synchronous type, having one of its terminals connected to the conductor 13 by a lead 19, and the other terminal grounded to the housing, as diagrammatically shown at 21.

The rotating shaft 27 of the motor 23 is connected to a speed reduction gear train 29 as the high speed shaft thereof. This train contains the required number of reduction gears of suitable and preferably integral ratios to effect the desired speed reduction between the high speed shaft 27 and its low speed shaft 31. Thus, as an example, if the motor 23 and shaft 27 rotate at 3600 R. P. M., and it is desired that the low-speed shaft 31 rotate at 6 R. P. M., six pairs of gears with individual ratios 3:1, 5:1, 2:1, 5:1, 2:1, 2:1, may be used. These gears may be specially designed for use in the present system, or may be of the commercial precision gear type. The design of gears and gear trains being well understood by those skilled in the art, and forming no part of the present invention, no details of the gears train 29 are shown in Fig. 1.

The low speed shaft 31 of the gear train has fixedly attached thereto a metallic disk or wheel element 33, to which there is in turn affixed a sweep contact element or arm 35. The elements 33 and 35 rotate together with the shaft 31, and are electrically insulated therefrom, and therefore also from the grounded housing 17, by means diagrammatically indicated at 32.

The rotation of the shaft 31 causes the sweep arm to contact cyclically a fixed reference element or pointer 37, and movable indicating elements or pointers 41 and 30, which are preferably mounted on resilient stems or springs 39, 43 and 34 respectively, so that a good electrical contact may be had between the sweep arm and the various pointers without danger of sticking.

The insulated metallc disk or wheel 33 is in continuous sliding electrical contact with a wiper element 26, serving as a terminal for a pulse circuit compartment 24, which is electrically connected through a lead 22 to the cable conductor 13.

The reference element or contact 37 is fixedly attached, through the resilient stem 39, to the housing 17, or to any stationary element within said housing, and is thus electrically grounded.

The condition-responsive or indicating elements or contacts 41 and 30, which are likewise electrically grounded, are affixed, through resilient stems 43 and 34, to the independently rotatable shafts 36 and 47 of a temperature responsive device 45 and a pressure responsive device 50, respectively.

The construction of suitable temperature and pressure responsive devices is well understood by those skilled in the art, and will not be described here except as to the principle involved. For the purposes of the present invention, it suffices to say that the temperature responsive device 45 may comprise a spiral bi-metallic element fixed at one end and attached at the other end to the shaft 36, whereby said shaft is caused to rotate by the expansion or contraction of said bi-metallic element in response to temperature variations. Likewise, the pressure responsive device 50 may comprise a Bourdon tube whose expansion or contraction causes in a similar way the shaft 47 to rotate.

It is however not necessary that temperature or pressure variations should be directly translated into rotational motion or displacement by means such as the spiral bi-metallic elements or tubes referred to above. These variations may cause a linear displacement of an element such as a plunger, which linear motion may then be converted into rotational motion by various mechanical means such as described in "Mechanical Movements, Devices and Appliances" by G. D. Hiscox, Norman V. Henley Publishing Co., New York, 1921.

The lower end of the casing 17 may be provided with apertures 51, whereby well pressure is communicated to the inside of the housing to actuate the pressure responsive device 50. The temperature responsive device 45 is normally at the temperature of the housing, which in turn assumes the temperature of the well fluid. Means such as diagrammatically indicated by a fluid tight partition 49 are used to protect the elements within the housing 17 from contact with the well fluid.

Figure 3:
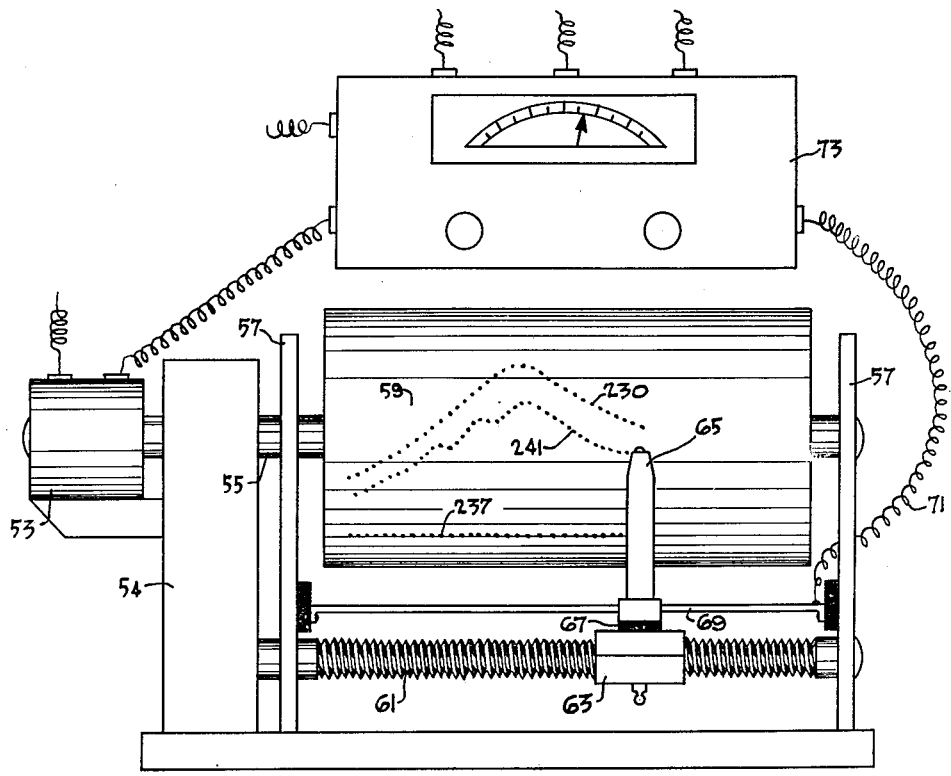
Fig. 3 is a diagrammatic view of the surface portion of the present system.

Fig. 3 shows the surface portion of the present recording system, in circuit with the subsurface portion of Fig. 1 through the cable 11.

A synchronous motor 53, having the same electrical characteristics and driven from the same source of alternating current as the motor 23 in housing 17, rotates, through a speed reduction gear train 54, a recording drum 59 mounted, for example, between bearings in uprights 57. The reduction train 54 may have a construction similar to that of the gear train 29, and its low speed shaft 55, on which the drum 59 is mounted, is exactly synchronized with the low speed shaft 31 of Fig. 1. Thus if shaft 31 and sweep arm 35 rotate at 6 R. P. M., the drum 59 is likewise rotated at 6 R. P. M.

The reduction train 54 is also adapted to rotate a lead screw 61 having a traveling nut 63 mounted thereon. By providing, in a manner well understood in the art, a gear shift mechanism or interchangeable gears in the gear train 54, the rotational speed of the lead screw 61 may be selectively varied so as to move the nut 63 along the lead screw at a predetermined linear speed such as, for example, from one half to six inches per hour.

The traveling nut 63 carries a marker 65 having a point in contact with the drum 59. The drum 59 and the rest of the system are preferably grounded, and the marker 65 is insulated therefrom by means such as diagrammatically indicated at 67. The marker 67 is in sliding contact with a bar 69, which is in turn electrically connected by a wire 71 to the energizing circuits of a unit 73 and thence to the subsurface portion of the present system. It is understood that this arrangement is shown only by way of illustration, since it is obviously possible to mount the lead screw between insulating bearings, and to supply electric current to the marker 65 directly through said lead screw and the traveling nut 63. It will also be readily understood by those familiar with electrical arts that the drum 59 may be mounted between insulating bearings and have a potential applied thereto while the marker 65 is grounded.

Figure 4:
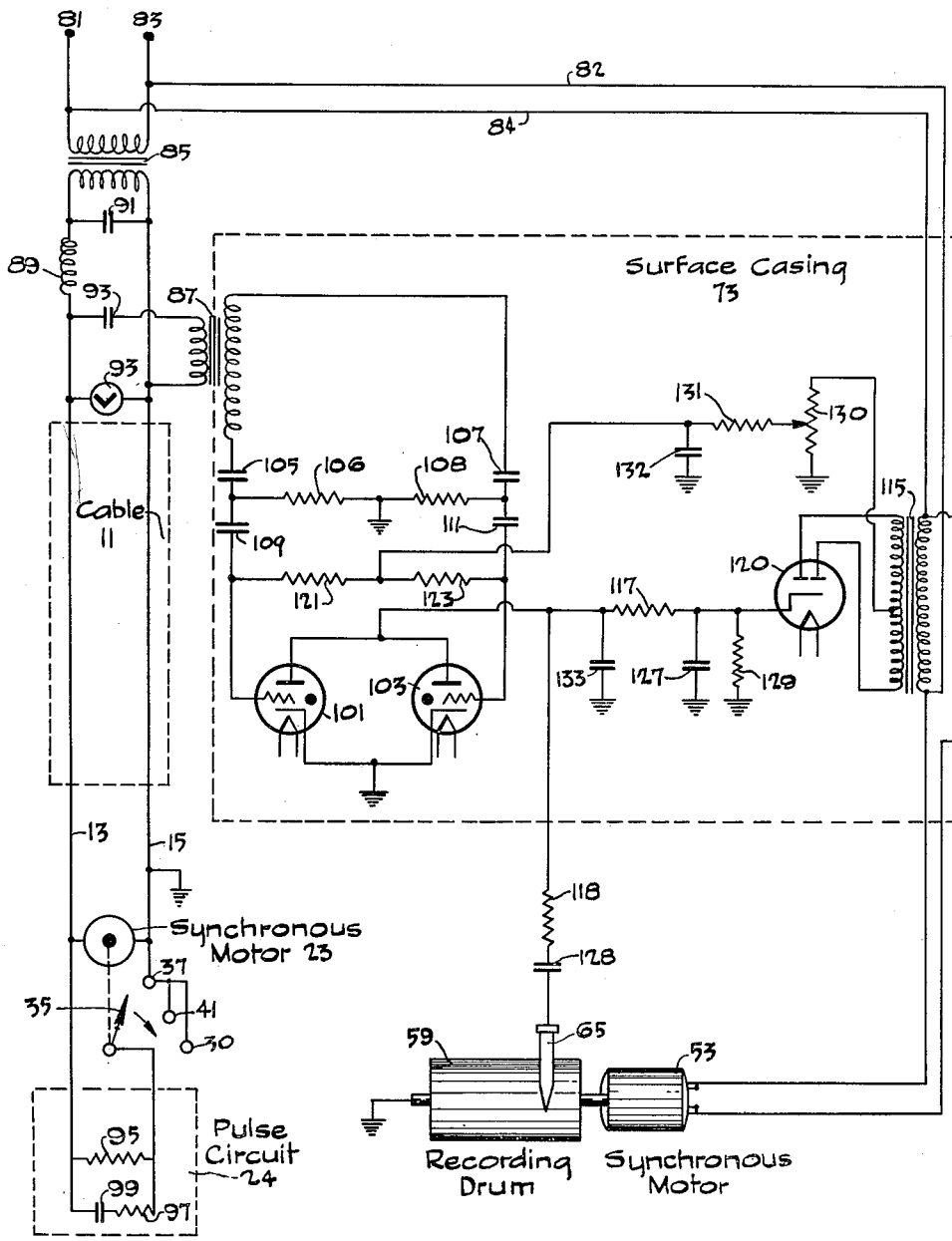
Fig. 4 is a diagram of the electrical circuit of the present system.

Fig. 4 is a schematic diagram of the electrical circuits combining the elements of Figs. 1 and 3 in a preferred embodiment of the present system, the same numerals being used throughout to designate the same elements.

Electric energy is supplied through a transformer 85 from terminals 81 and 83 of any suitable source, such as a regular A. C. power supply line of about 110–120 volts, and 50–60 cycles.

This energy is transmitted to the subsurface elements within the housing 17 through the cable 11, and to the surface circuits within the casing 73 of Fig. 3 through an insulation transformer 87.

A low pass filter comprising, for example, an inductance 89 and condenser 91 is used to prevent the subsurface signals from passing to the power line. A voltmeter 93 may be used to measure the voltages between the two leads formed by the conductor and the return sheath of the cable 11.

The subsurface portion of the system comprises essentially the elements already described with regard to Fig. 1. The pulse circuit 24 may comprise, for example, a condenser 99 and resistance 97 connected in parallel with a resistance 95 across the motor 23.

The surface portion of the system comprises the synchronous motor 53 and recording drum and marker elements 59 and 65, described with regard to Fig. 3.

Leads 82 and 84 are used to drive the motor 53 of the surface recording equipment in synchronism with the subsurface motor 23.

The circuits within the casing 73 of Fig. 3 comprise essentially thyratron tubes 101 and 103 connected in parallel in such a manner that only one tube is firing at any moment. This may be accomplished in any desired manner well understood by those skilled in the art, using either A. C. or D. C. excitation for the thyratron tubes. A preferred arrangement will be briefly described with regard to Fig. 4 insofar as necessary to understand the operation of the present invention.

Signals from the subsurface portion of the system are impressed on the grids of the thyratron tubes 101 and 103 through the transformer 87 and a high-pass filter system comprising condensers 105, 107, 109 and 111 and resistances 106 and 108 having a ground therebetween.

Excitation is provided for the thyratron tubes 101 and 103 from any source of direct current, such for example as a rectifier tube 120 energized from terminals 81 and 83 through a tapped transformer 115. The anode of the rectifier 120 is connected to the grids of tubes 101 and 103 through a resistance 131 forming a potentiometer connection between a grounded resistance 130 and a grounded filter condenser 132. The cathode of rectifier 120 is connected to the plates of tubes 101 and 103 through a lead comprising a resistance 117 between grounded condensers 127 and 133 and a parallel grounded high resistance 129, having a value such as a megohm, resistance 117 and condenser 133 forming a relaxation extinction circuit. It will thus be seen from Fig. 4 that this arrangement provides a relaxation extinction circuit for the thyratron tubes and a bleeder circuit for the rectifier.

The operation of the present system may be briefly described as follows.

The temperature-responsive element 45 and the pressure-responsive element 50 are adjusted and calibrated for any suitable range, such for example as a temperature range of from 50 to 350° F. and a pressure range of from atmospheric pressure to 5000 lbs./sq. inch.

Figure 2:
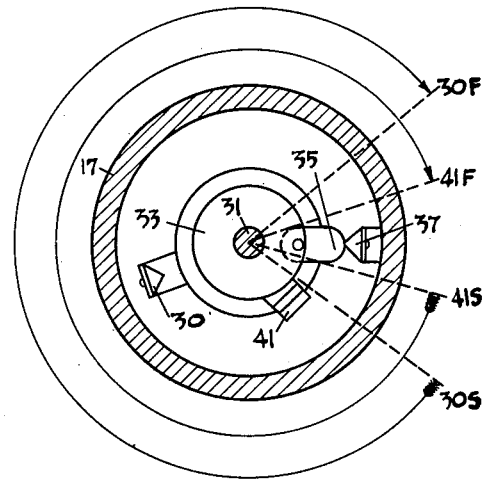
Fig. 2 is a cross-section view taken along line 2—2 of Fig. 1.

Referring to Fig. 2 for an illustrative example, it will be assumed, for example, that the temperature-indicating contact 41 has been adjusted to have its center-line along the dotted line 41S for a surface temperature such as 60° F., and to move clockwise by increments proportional to temperature increases to a final position at the dotted line 41F corresponding to a temperature such as 350° F. At the same time, the pressure-indicating contact 30 is adjusted to move in a similar manner between an initial position 30S, corresponding to atmospheric pressure, and a final position 30F, corresponding to a pressure such as 5000 lbs. per square inch. It is understood that line 41S may coincide with line 30S, and line 41F with line 30F, each of the contacts 30 and 41 being capable of an angular displacement of nearly 360 degrees.

As the housing 17 is lowered into a well on the cable 11, the circuits of Fig. 4 are energized, and the motors 23 and 53 rotate the sweep arm 35 and the drum 59 in synchronism, for example, at 6 R. P. M., while the marker 65 of Fig. 3 travels in a direction parallel to the axis of the recording drum at a rate of 1 inch per hour.

As the sweep arm 35 contacts the fixed reference index 37, thereby closing the pulse circuit 24 once for each revolution of the shaft 31, an impulse is produced by said pulse circuit. This signal is relayed to the surface by the cable 11, raised by the thyratron circuit to a desired high voltage such as 400 volts, and applied between the marker 65 and the drum 59 through the electrolytic record paper stretched over the face of the drum. The passage of a current or spark through the paper results in a discoloration in the form of a small dot being marked on the paper. Since the rotation of the sweep arm 35 is synchronized with that of the drum, these dots will form a substantially straight reference line or the record paper, as shown at 237 in Fig. 3 there being, for the constants taken as an example, 360 such dots per linear inch.

Likewise once for each revolution, the sweep arm 35 contacts the temperature responsive element 41, the time interval between the closing of contacts 35—37 and contacts 35—41 depending on the rotational or angular displacement of the element 41 under the effect of temperature variations. Thus, as the housing 17 is lowered to greater well depths, usually associated with higher temperatures, the element 41 will move (clockwise in the present illustrative example) away from the reference index 37, and the contacts 35 and 41 will close, on each successive revolution, after an increasingly large time interval from the closing of contacts 35 and 37. The pulses and the spark discharges thus produced will result, in a manner similar to that already described hereinabove, in a temperature record line 241 being traced on the electrolytic paper. Since the drum 59 rotates in synchronism with the arm 35, each point on line 241 will be separated from a corresponding point on reference line 237 by the same number of angular degrees as contact 41 is separated from the reference contact 37. Again in a similar manner, the closing of the contacts 35 and 39 will produce a third line, such as the pressure record line 230 in Fig. 3.

It is obvious that the ordinates of a curve such as 230 or 241, projected on the basic reference line 237, represent, for any given moment, the instantaneous values of any particular well condition, in this case temperature or pressure, being recorded. By properly calibrating the instrument, an accuracy of the order of 0.1 per cent may be obtained by the present system.

These values can be readily correlated with any particular well depths by synchronizing or coordinating the operation of the present system with that of the reel or any other device on which the housing 17 is lowered underground.

It is likewise obvious that, as stated above, the present system is not limited to temperature and pressure measurements, and that furthermore should it be desired to record simultaneously more than two independent variable well conditions, additional elements, responsive to such conditions may be arranged within the housing 17 and provided with further indicating elements similar to elements 39 and 41 without departing from the spirit of the present invention.

Figure 5:
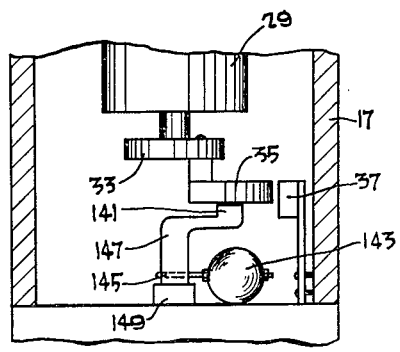
Fig. 5 is a view similar to that of Fig. 1, showing an embodiment of the present system adapted for whipstock orienting operations.

For the purpose of illustrating the adaptation of the present system for purposes of recording conditions other than pressure and temperature, reference is had to Fig. 5, showing a portion of the present system as utilized in connection with the setting of a whipstock.

In Fig. 5, elements such as the reduction gear train 29, sweep arm 35 and reference index 37 are indicated by the same numerals as in Fig. 1. The condition responsive element is formed as a heavy metallic ball 143 rotatably mounted on shaft 145 rigidly connected to a transverse axial shaft 147 which is likewise rotatably mounted in a ball bearing 149. The shaft 147 is provided with an indicating element 141 adapted to contact the sweep arm 35, said element 141 being arranged in a vertical plane passing through the axis of shaft 145.

In a manner familiar to those skilled in the art, the housing carrying the system of Fig. 5 may be lowered into a drill string carrying a whipstock in such a manner that the reference index 37 lies in the plane of symmetry of the whipstock. If the borehole and the drill string are deflected from the vertical, the ball 143 will seek a position on the lowermost side of the housing, carrying the marker 141 with it. The angular deflection between the reference index 37, that is, the plane of symmetry of the whipstock, and the indicating element 141, that is, the plane of deflection of the drill string, is thereafter determined from the record traced by the present system when the sweep arm consecutively contacts elements 37 and 141. The whipstock may then be set, from the indications of this record, in any desired angular relation to the plane of deflection of the borehole.

I claim as my invention:

1. A system for recording changes in a variable subsurface condition comprising a subsurface detector and a surface recorder, said detector comprising a fixed reference contact, a rotatable contact, means responsive to subsurface condition changes for angularly displacing said rotatable contact substantially throughout 360 degrees with regard to said reference contact proportionally to said condition changes, a rotatable sweep contact, first synchronous motor means for continuously rotating said sweep contact at a predetermined constant speed, whereby said sweep contact cyclically closes with said reference and said rotatable contact once for every revolution of said sweep contact, said surface recorder comprising two recording contacts, one of said recording contact being rotatable with regard to the other, second synchronous motor means energized by the same alternating current as said first synchronous motor means for rotating said rotatable surface recording contact at a speed synchronized with the rotation speed of said sweep contact, and electrical circuit means connecting said subsurface and said surface contacts, whereby an electric current is passed between said recording surface contacts only during the closing of said sweep contact with said reference contact and said rotatable detector contact.

2. The system of claim 1, wherein the surface contacts comprise a drum element and a marker element, said drum element being the rotatable element, and means actuated by the synchronous motor means rotating the drum element for displacing the marker element in a direction parallel to the axis of the drum at a predetermined constant speed.

3. A system for recording subsurface temperatures, comprising a housing adapted to be lowered into a borehole at the end of a cable, a fixed reference contact in said housing, a temperature responsive device mounted in said housing, a rotatable contact actuated by said device for angular displacement substantially throughout 360 degrees with regard to said reference contact proportional to temperature changes, first synchronous motor means in said housing, a rotatable sweep contact in said housing actuated by said prime mover means for continuous rotation at a predetermined constant speed, said sweep contact being adapted to close with said reference and said rotatable contact once for each revolution of said sweep contact, a surface recorder comprising two contacts, one of said contacts being rotatable with regard to the other, second synchronous motor means energized by the same alternating current as said first synchronous motor means for driving said rotatable element at a speed synchronized with the rotation speed of the sweep contact, and electrical circuit means connecting said housing and said recorder contacts, whereby an electric current is passed between said recorder contacts only during the closing of the sweep contact with the reference contact and the rotatable contact in the housing.

4. A system for recording subsurface pressures, comprising a housing adapted to be lowered into a borehole at the end of a cable, a fixed reference contact in said housing, a pressure responsive device mounted in said housing, a rotatable contact actuated by said device for angular displacement substantially throughout 360 degrees with regard to said reference contact proportional to pressure changes, first synchronous motor means in said housing, a rotatable sweep contact in said housing actuated by said prime mover means for continuous rotation at a predetermined constant speed, said sweep contact being adapted to close with said reference and said rotatable contact once for each revolution of said sweep contact, a surface recorder comprising two contacts, one of said contacts being rotatable with regard to the other, second synchronous motor means energized by the same alternating current as said first synchronous motor means for driving said rotatable contact of the recorder at a speed synchronized with the rotation speed of the sweep contact, and electrical circuit means connecting said housing and said recorder contacts, whereby an electric current is passed between said recorder contacts only during the closing of the sweep contact with the reference contact and the rotatable contact in the housing.

5. A system for recording changes in a variable physical condition at a recording location remote from the location at which said changes are detected, said system comprising a detector sensitive to said changes and a recorder remote from said detector and electrically connected thereto and to a common source of A. C., said detector comprising a fixed reference contact, a rotatable contact, means responsive to said changes for angularly displacing said rotatable contact substantially throughout 360 degrees with regard to said reference contact in proportion to said condition changes, a rotatable sweep contact, a first synchronous motor for continuously rotating said sweep contact at a constant speed, whereby said sweep contact cyclically closes with said reference contact and said rotatable contact once for every revolution of said sweep contact, said recorder comprising two recording contacts, one of said recording contacts being rotatable with regard to the other, a second synchronous motor energized by the same A. C. source as the first synchronous motor for rotating said rotatable recording contact at a speed synchronized with the rotation speed of the detector sweep contact, and circuit means electrically connecting said detector and said recorder contacts, whereby an electric current is passed between said recording contacts only during the closing of said sweep contact with said detector reference and rotatable contacts.

References Cited in the file of this patent

UNITED STATES PATENTS

| Number | Name | Date |
|---|---|---|
| 1,928,969 | Kuffel | Oct. 3, 1933 |
| 1,928,970 | Johnston | Oct. 3, 1933 |
| 1,928,971 | Dillon et al. | Oct. 3, 1933 |
| 2,245,700 | Mounce | June 17, 1941 |
| 2,382,609 | Dale | Aug. 14, 1945 |
| 2,400,828 | Keinath | May 21, 1946 |
| 2,403,889 | Di Toro | July 9, 1946 |
| 2,409,155 | Schellens et al. | Oct. 8, 1946 |
| 2,441,065 | Green | May 4, 1948 |
| 2,442,561 | Finch | June 1, 1948 |
| 2,534,841 | Wallace | Dec. 19, 1950 |

OTHER REFERENCES

German publication, Gerlands Beitrage Zur Geophysik, 1931, No. 31.